Figure 1:
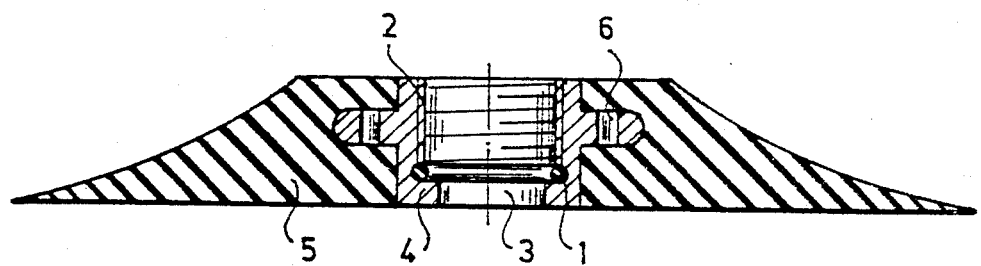

United States Patent [19]

Palotás et al.

[11] Patent Number: 4,880,208

[45] Date of Patent: Nov. 14, 1989

[54] TWO-PIECE VALVE SYSTEM FOR BODIES TO BE FILLED WITH A GASEOUS MEDIUM, LIQUID, IN PARTICULAR FOR PRODUCTS OF THE RUBBER INDUSTRY

[75] Inventors: László Palotás, Budapest; Géza László, Nyiregyháza; Lázlo Horvath; Árpádné Baria, both of Budapest; Barnabás Márion; Ferencné Szarka, both of Nyiregyháza, all of Hungary

[73] Assignee: Taurus Gumiipari Vallalat, Budapest, Hungary

[21] Appl. No.: 222,942

[22] Filed: Jul. 22, 1988

[51] Int. Cl.⁴ ............................. F16L 5/00; F16L 33/00
[52] U.S. Cl. ................................... 251/356; 285/200; 285/238; 152/430
[58] Field of Search ................ 152/430; 285/200, 238, 285/355; 251/356

[56] References Cited

U.S. PATENT DOCUMENTS

| | | | |
|---|---|---|---|
| 1,858,251 | 5/1932 | Spicer | 285/200 |
| 2,126,770 | 8/1938 | Hammond | 152/430 |
| 2,261,833 | 11/1941 | Kreyer | 285/238 |
| 2,318,376 | 5/1943 | Crowley | 285/200 |

*Primary Examiner*—A. Michael Chambers
*Attorney, Agent, or Firm*—Handal & Morofsky

[57] ABSTRACT

The present invention relates to a two-piece valve system for bodies to be filled with gaseous media, liquids, in particular for products for the rubber industry, provided with a valve body embedded in a rubber socket and a valve stem connectable with a thread to the valve body. The characteristic feature of the invention is that the valve body (4) is embedded in its full height in the rubber socket (5), on the inner wall of the throughbore (3) of the valve body (4) a connecting thread (2) is formed, while the outer wall of the valve stem (9) is also provided with a connecting thread (7) and in the inside of the valve body (4) and the threaded end of the valve stem (9) seats (8) are formed for receiving the O-ring (1).

6 Claims, 1 Drawing Sheet

U.S. Patent

Nov. 14, 1989

4,880,208

TWO-PIECE VALVE SYSTEM FOR BODIES TO BE FILLED WITH A GASEOUS MEDIUM, LIQUID, IN PARTICULAR FOR PRODUCTS OF THE RUBBER INDUSTRY

The invention relates to a two-piece valve system for bodies to be filled with gaseous media, liquids, in particular for products of the rubber industry, provided with a valve-body embedded in a rubber socket and a valve stem connectable with a thread to the valve body.

A plurality of metal valves of different constructions and made of the most diverse basic materials for the products of the rubber industry are known and available on the market. These can be divided in two main types, namely there are one-part and two-part valves. Recently, mostly two-part valves became most popular. The advantage of the two-part valves lies namely in that in case of the damage of the valve stem the stem can be exchanged, accordingly neither the whole hose is to be discarded, nor the complete valve is to be exchanged.

The US-PS 3,742,998 specifies e.g. a valve body consisting of two parts, however, with this solution sealing could not be solved satisfactorily when disassembled, the part remaining in the rubber body carries the spindlethread of the screw, while the mother thread is left in the removed tubular profile.

The German patent specification No. 1 815 789 discloses a solution for achieving better sealing, however, this construction has the disadvantage that the valve body projects from the rubber socket in the usual way, as a consequence, rubber may be easily damaged in course of transport and storage, respectively.

For the same reason rubber can get damaged if the solution according to the Hungarian patent specification No. 95 140 is used, with which it is considered as disadvantageous that proper sealing could not be attained.

German patent specification No. 2 250 416 and 2 522 103 disclose a solution with a not even partly removable component. A valve body with a screwed connection which can be removed inwards only became known from the US-PS 3,722,569 and the German OS 3 111 788.

Hungarian Patent Specification described a valve body with a flanged fixation, this can be removed with destruction only, the same relates to the solution according to the Hungarian patent specification No. 83 350, wherein valve body is vulcanized into the rubber.

A further disadvantageous feature of known valve systems lies in, if it is intended to use a hose having been provided with the known two-part valve as a tool, e.g. for the regeneration of the surface of a tyre, inflation and deflation of the tyres require a long time resulting from the incosiderable permeability of the valve system, even if the valve stem has been removed previously from the valve body.

The aim of the invention is to eliminate known deficiencies of the valve systems specified and to develop a two-part valve system, by the aid of which tasks connected to sealing can be properly fulfilled and through the valve body of which hoses can be inflated a deflated easily and quickly.

Accordingly, the invention relates to a two-part valve system, provided with a valve body embedded in a rubber socket and a valve stem connected with a thread to the valve body.

The characteristic feature of the invention is that the valve body is embedded in its full height into the rubber socket and on the wall of the bore of the valve body—being permeable to air—a connecting thread is formed, while on the outer wall of the valve stem a connecting thread is also elaborated, in the inside of the valve body and at the threaded end of the valve stem are seats for an O-ring.

In order to achieve safe embedding of the valve body in the rubber socket on the flange of the valve body bores enhancing adhesion are formed.

The valve system according to the invention solves fully the task set, an excellent sealing can be obtained, after having screwed out the valve stem from the valve body, hoses can be inflated and deflated quickly.

Figure 2:
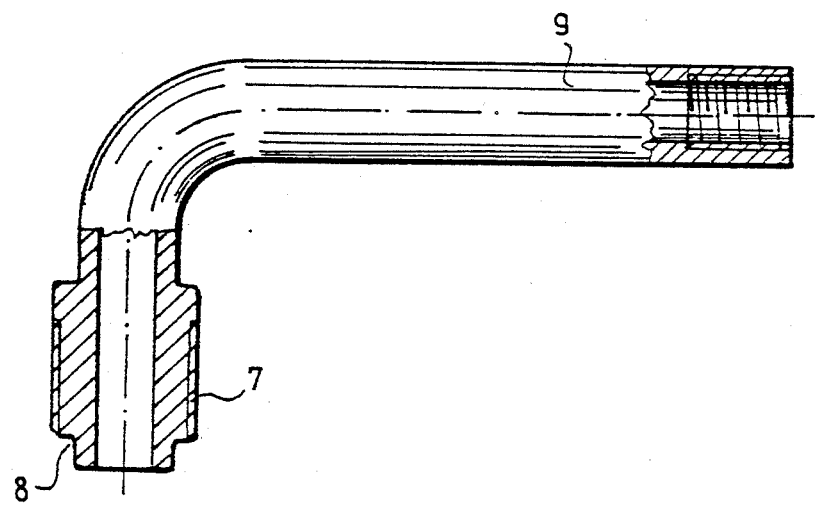

The invention will be described in detail by means of a preferred embodiment, by the aid of the accompanying drawings, wherein FIG. 1 is the sectional view of the valve body embedded into the rubber socket, FIG. 2 is the side—and sectional view of the valve stem to be connected to the valve body.

As it becomes obvious from the figure, the valve body 4 is embedded into a rubber socket 5, on the inner wall of the valve body 4 a connecting thread is formed. A valve body 4 is provided with a throughbore 3 with a relatively large diameter and at the end of the thread 2 a seat for receiving the O-ring is to be found.

As it is to be seen in FIG. 2, at the outer end of the valve stem 9 connected to the valve body 4 there is a connecting thread 7, a seat 8 fitting to the O-ring is arranged there too.

The height of the valve body 4 must not be larger, than the thickness of the rubber socket and must not project in any direction.

In order to achieve better adhesiion to the rubber socket, on the flange of the valve body the bores 6 are formed, it goes without saying that the material of the rubber socket 5 engages therewith.

When the valve stem 9 is screwed into the valve body 4 the O-ring 1 gets pressed between the corresponding seats of the valve stem 9 and the valve body 4, thus producing an excellent sealing.

As it becomes obvious from the embodiment serving as an example, after having removed the valve stem a relatively large permeable cross-section is staying at disposal.

By virtue of the fact that the valve body does not project from the rubber socket, the valve system can be transported and stored easily, damage of the rubber products can be avoided, so these can be packed and stored as bulk goods.

Bores 6 promote adhesion between metal and rubber by establishing an airproof connection and forming a mechanically stronger bond.

What we claim:

1. A two-part valve system comprising a valve body embedded into a rubber socket and a valve stem connected thereto with a thread, wherein the valve body is embedded in its full height in the rubber socket, on the inner wall of the throughbore of the valve body a connecting thread is formed while the outer wall of the valve stem is also provided with a connecting thread and in the inside of the valve body and on the threaded end of the valve stem seats are formed for receiving an O-ring.

2. Two-part valve system as claimed in claim 1, wherein the flange of the valve body is formed with bores thereby improving adhesion.

3. A valve system comprising:
   (a) a rubber socket;
   (b) an O-ring;
   (c) a short valve body fully embedded in said rubber socket, said valve body defining a throughbore of relatively large diameter with a connecting thread thereon and further defining a seat for said O-ring; and
   (d) a valve stem provided with a connecting thread and an O-ring seat designed, proportioned and dimensioned to matingly engage said valve body and said O-ring and separable therefrom.

4. A valve system as claimed in claim 3 wherein said short valve body has a height approximately equal to the diameter of said throughbore.

5. A valve system as claimed in claim 4 wherein said valve body has a flange provided to more securely embed said valve body within said rubber socket.

6. A valve system as claimed in claim 5, wherein said flange defines bores further securing said valve body within said rubber socket.

* * * * *